Jan. 4, 1944.   W. JIRSAK ET AL   2,338,436
TRACK CHAIN VEHICLE
Filed Dec. 6, 1940   2 Sheets-Sheet 1

Inventors
Wilhelm Jirsak and Otto Falk
BY
Richards & Geier
ATTORNEYS

Jan. 4, 1944. W. JIRSAK ET AL 2,338,436
TRACK CHAIN VEHICLE
Filed Dec. 6, 1940 2 Sheets-Sheet 2

INVENTORS:
WILHELM JIRSAK,
AND OTTO FALK
BY Richardy Geier
ATTORNEYS

Patented Jan. 4, 1944

2,338,436

UNITED STATES PATENT OFFICE 2,338,436

TRACK CHAIN VEHICLE

Wilhelm Jirsak and Otto Falk, Breslau, Germany; vested in the Alien Property Custodian Application December 6, 1940, Serial No. 368,866
In Germany June 20, 1939

2 Claims. (Cl. 305—9)

This invention relates to track chain vehicles and refers more particularly to a mounting for the runners of such vehicles.

Vehicles which are movable along track chains are provided with runners carried by supporting springs. Track chains upon which the vehicles are moved are provided with guide-rollers. Since the plates which compose the track chains adapt themselves to the unevenness of the ground, these guide rollers are subjected to strong transverse forces and turning forces.

These forces and the turning moments created thereby may be absorbed by a yieldable intermediate member situated between the roller support and the spring support of the vehicles, or they are received by the springs themselves. The result is that the springs and their attachment suffer considerable strain and may be easily broken.

Attempts to eliminate this danger and to prevent damage to runners or rollers resulting from the uneven arrangement of the plates of a track chain have not been successful so far. Furthermore, when constructing a runner suspension for the vehicles it should be taken into consideration that masses which are not supported by springs should be as small as possible in order to provide an easy and economic track movement. Therefore, the springs must be located as closely as possible to the axes of the runners. But, when such a construction is used, the turning movements resulting from the unevenness of the track chain will affect the springs and will subject them to a severe strain.

An object of the present invention is to eliminate these drawbacks and to provide an effectively operating and sturdy runner suspension for track chain vehicles.

Other objects of the present invention will become apparent in the courses of the following detailed specification.

In accomplishing the objects of the present invention, it was found advisable to secure the supporting springs of the runners against the detrimental effect of transverse and turning forces by providing a guide for the runner support, said guide being rigidly connected with the vehicle. In accordance with the present invention, the supporting springs are situated between two runner discs which are mounted upon the same axle and which constitute a single runner. This axle of the runner is mounted in a supporting casing which is movably guided in relation to an axle support which is attached to the vehicle. The supporting springs have the form of half leaf springs and are rigidly connected with the frame of the vehicle in such manner that a line extending between the place of attachment of each individual runner support to the vehicle and the axle of the runner extends obliquely. The runners are so closely arranged that the spring support of each runner which consists of a plurality of half leaf springs, projects into the space between two discs of an adjacent runner, the swinging of one runner being limited by a stop carried by a spring support of an adjacent runner.

The invention will appear more clearly from the following detailed description when taken in connection with the accompanying drawings showing, by way of example, a preferred embodiment of the inventive idea.

Figure 1:
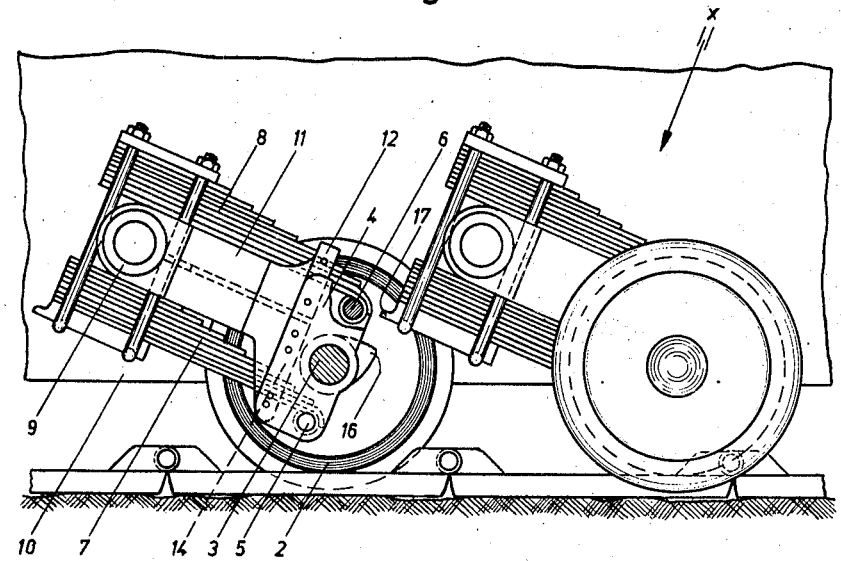
Figure 1 is partly a side elevation of and partly a section through a runner suspension which is constructed in accordance with the principles of the present invention.
Figure 2:
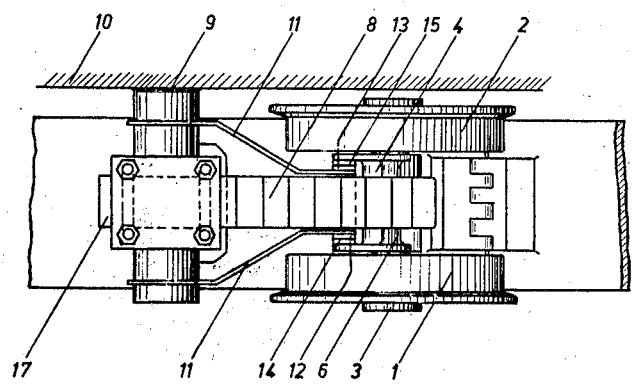
Figure 2 is a top view, looking in the direction of the arrow $x$ shown in Figure 1.
Figure 3:
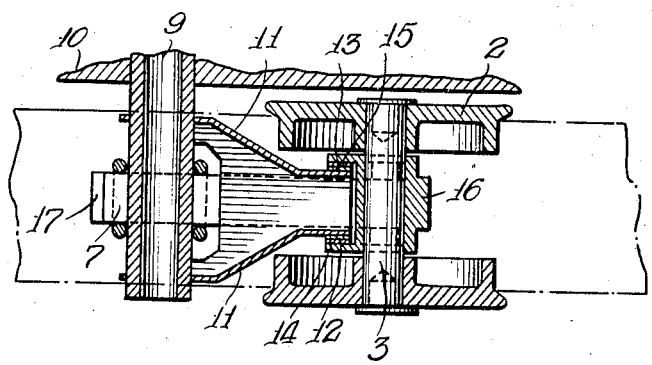
Figure 3 is a section through an axle support.
Figure 4:
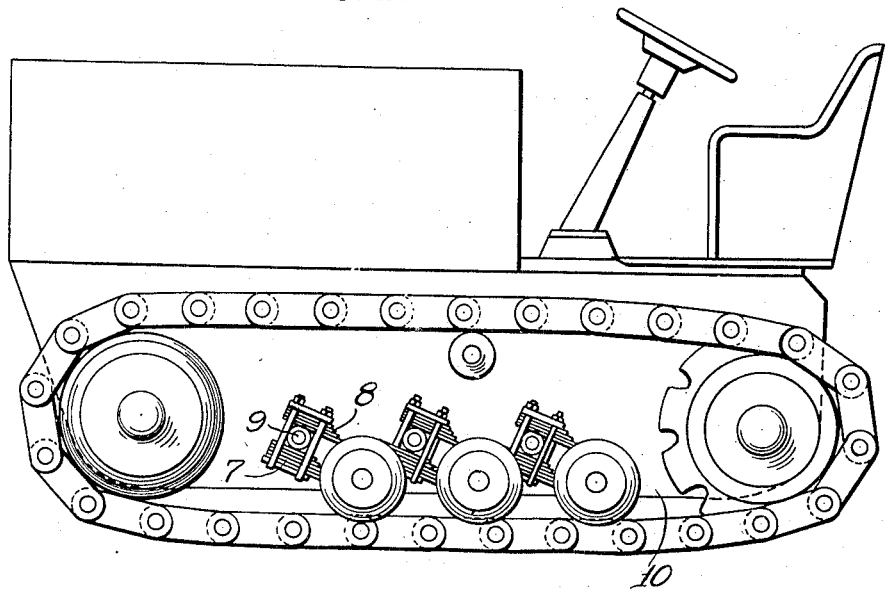
Figure 4 shows in side elevation a vehicle provided with the runner suspension shown in Figures 1 to 3.

The runner suspension which is shown in the drawings comprises a runner consisting of two runner discs 1 and 2 which are mounted upon the ends of a common axle 3. The axle 3 is mounted in an axle casing 4 carrying the bolts or pivots 5 and 6. Resilient supports 7 and 8 consist of a plurality of half leaf springs the adjacent ends of which engage the bolts or pivots 5 and 6. The spring supports 7 and 8 are firmly connected with a carrier or support 9 which is rigidly connected to the frame 10 of the vehicle.

Axle supports 11 are also rigidly connected with the supports 9. The supports 11 include two guides 12 and 13 which are in engagement with projecting portions 14 and 15 of the casing 4.

The casing 4 has another projection 16 which cooperates with a projection 17 attached to the spring support of an adjacent runner. The projections 16 and 17 limit the extent of upward movement of one runner in relation to another one.

This arrangement has the advantage that the guides 13 and 14 receive all the transverse forces and turning forces which are transmitted by the runners, so that these forces are prevented from reaching the springs. The spring supports 7 and 8 may be moved only in the direction of their plane of oscillation and thus any excessive forces upon the springs and upon the roller suspension are effectively avoided.

Due to the provision of two roller discs carried upon a common axle and constituting a single runner, the plates of the track chain are subjected to pressure close to their opposed edges, so that the bending of the plates and the resulting strain upon the links joining the plates are avoided or diminished to the greatest possible extent. Due to the inclined arrangement of the spring supports, which engage the middle of the axle, the springs may be made longer and more supple, as compared to horizontal leaf springs and rollers situated at equal intervals which are known in prior art.

Another advantage of the described construction is that it is possible to place the runners very closely to each other by arranging the springs between the roller discs of each runner. The small distance between the rollers makes it possible to diminish the turning movements transmitted by the track chain plates and their links to the greatest possible extent.

It is apparent that the specific illustration shown above has been given by way of illustration and not by way of limitation, and that the structure above described is subject to wide variation and modification, without departing from the scope or intent of the invention. All of such variations and modifications to be included within the scope of the present invention.

What is claimed is:

1. In a track chain vehicle having a vehicle frame; two roller discs, a common axle carrying said roller discs, spring supports, each of said spring supports consisting of a plurality of half leaves extending at an acute angle to the plane of movement of the vehicle, an axle support situated at each side of said spring supports, a single carrier connected to the vehicle frame and carrying said spring supports and said axle supports, and means connecting said axle with said spring supports and said axle supports.

2. In a track chain vehicle having a vehicle frame; two roller discs, a common axle carrying said roller discs, spring supports, each of said spring supports consisting of a plurality of half leaves extending at an acute angle to the plane of movement of the vehicle, an axle support situated at each side of said spring supports, said axle supports having guides extending between the two roller discs, a single carrier connected to the vehicle frame and carrying said spring supports and said axle supports, a casing carrying said axle and including projections contacting said guides, and means connecting said casing with said spring supports.

WILHELM JIRSAK.
OTTO FALK.